United States Patent Office 3,458,301
Patented July 29, 1969

3,458,301
METHOD OF MANUFACTURING A WHITISH GRANULAR AGGREGATE FOR BUILDING PURPOSES FROM A CRYSTALLISABLE, VITREOUS MATERIAL
Karl Kristian Kobs Kroyer, 80 Vestre Kongevej, Viby, near Aarhus, Denmark
No Drawing. Filed Feb. 24, 1965, Ser. No. 435,033
Claims priority, application Denmark, Feb. 25, 1964, 917/64
Int. Cl. C03b 19/10
U.S. Cl. 65—21
12 Claims

ABSTRACT OF THE DISCLOSURE

Forming a whitish, devitrified glass, granular aggregate for building purposes comprising mixing a thermally crystallizable vitreous material and quartz sand wherein the ratio of quartz to vitreous materials is no greater than 5:1 parts, heating the mixture of said vitreous material in a rotary kiln to form a kneadable mass in which the sand grains are embedded and subsequently thermally crystallizing the crystallizable vitreous material to produce a devitrified glass aggregate. The product is useful for road construction and reflects light to give a bright appearance to the road surface.

---

The present invention relates to a method of manufacturing a whitish granular aggregate for building purposes from a crystallisable, vitreous material.

There are known granular aggregates for building purposes, more particularly road construction materials, consisting of crystallised material on a glass basis, also called devitrified glass. Such aggregates possess the advantage over natural stone materials used as aggregate material in road construction that they reflect the light in such manner as to give a bright appearance to the road surface, notwithstanding that the aggregate is embedded in black asphalt.

These known materials are manufactured by melting together glass-forming constituents so as to produce a crystallisable, vitreous material and subsequently provoking a crystallisation of the material, which may be effected by keeping it at a temperature below the melting temperature for a suitable time or by re-heating the crystallisable material to such a temperature, if it has been cooled first.

Examples of such materials and their manufacture are described i.a. in the British patent specifications Nos. 795,787 and 897,125.

These known granular aggregates have in addition to the aforesaid optical properties substantial frictional qualities which make them still more valuable as aggregate material for road construction in which, of course, it is important to obtain a road surface with substantial frictional qualities so that skidding, especially of motor cars, may be avoided. However, these known materials are relatively costly.

It has now been found that on the basis of a crystallisable, vitreous material of a kind similar to that arrived at as an intermediary product in manufacturing the known granular aggregates, other granular aggregates for building purposes may be manufactured, which aggregates are not only cheaper than the known ones, but possess still better frictional qualities than these and are therefore still more suitable for road construction and for many other purposes, in particular purposes requiring a mineral aggregate, for example in concrete constructions.

An essential feature of the method according to the invention is that a mixture of the crystallisable, vitreous material and quartz sand in a ratio down to 1:5 is heated in a rotary kiln to such a degree of melting of the vitreous material as to form a kneadable mass in which the sand grains are embedded, after which a crystallisation of the crystallisable, vitreous material is provoked. As a result, the sand grains will be subject to such a conversion that in the finished product they are whitish and firmly bound in the crystallised, vitreous material. There is thus obtained a product that has been rendered cheap by being enriched with the cheap sand and which, compared with the known crystallised, vitreous materials, has preserved the optical properties of the latter and therefore is very suitable for the manufacture of light-reflecting road surface coatings, even with the simultaneous use of black binders as asphalt, but has improved frictional qualities, since the sand grains, which have a high melting point, are only molten superficially and are firmly united with the vitreous mass, but otherwise preserve their identity as separate particles contributing to maintain a rough condition of the surface of the material, even though it is subjected to wear.

The ratio of sand to crystallisable, vitreous material must, as mentioned, not exceed 5:1, since the molten, vitreous material has to be capable of filling out the cavities between the sand grains because, otherwise, there will be no embedding of the sand grains in the glass mass. Unless this takes place, the product will be of inferior strength.

The method according to the invention is preferably carried out in a rotary kiln driven at such speed that the kneadable mass is nodulised. This ensures the best intermixing of the sand grains with the molten, glass mass, and it is possible to obtain a product of the desired nodule size.

In the manufacture of the crystallisable, vitreous material, which is one of the starting materials of the present method, a part of it is obtained with a grain size of 0–3 mm. This grain size is less used than the larger grain sizes, the material being mainly used for road construction, for which the grain size 3–12 mm. is more suitable. However, the said grain size of 0–3 mm. is the preferred one for the starting material used for the present method because this material will give a more uniform mixture with the sand, which in nature mainly occurs in small grain sizes, for example in the form of beach sand or dune sand.

According to the invention the sand used is preferably of a grain size of less than 1 mm., since there will thus be a minimum of mechanical stresses in the product owing to the coefficient of thermal expansion of the sand differing from that of the vitreous material.

In the method according to the invention the granular mixture of sand and crystallisable, vitreous material which is introduced into the upper end of the rotary kiln is gradually heated to such a high temperature that the vitreous material melts, whereas the sand grains remain unmolten, but undergo a conversion by which they become white and furthermore unite with the surrounding vitreous mass in which they become embedded. It has not been clarified what physical and chemical processes are the cause of the result obtained, but it is possible that certain chemical reactions in the border layers between the vitreous mass and the sand grains contribute to the whiteness of the product and to the firm embedding of the sand grains in the vitreous mass.

During the passage of the material through the kiln there will be a formation of nodules which grow in size as smaller lumps are continually being kneaded together to form larger ones.

If this process is allowed to continue for a sufficient time, that is, if, for example, the material takes too much time to pass through the kiln, the latter will be clogged.

The different variables of the production such as the speed of rotation, the dimensions and the inclination of the kiln and the temperature variations in same have, of course, to be such that no such thing occurs. However, the process is preferably controlled in such manner that the nodules obtained are of rather big size, for example from the size of an egg to the size of a football, in fact, larger than the size of the granular material which has the widest range of uses. In fact, even though a subsequent crushing thus becomes necessary, this is nevertheless preferable, since it has been found that a more homogeneous product is obtained in this way.

The product is, to be true, not homogeneous in the absolute sense, but if the mechanical treatment to which the kneadable mass is subjected by tumbling over in the rotary kiln does not last sufficiently long, the product becomes too porous and consequently of inferior strength.

The method according to the invention is therefore preferably carried out in the manner that by adjustment of the variables of the production care is taken to ensure such a retention time for the material in the kiln that at the kiln outlet nodules are obtained of a size up to about ½ m. in diameter, these being subsequently reduced by crushing to the desired grain size.

To prevent excessive growth of the nodules, sand may according to the invention be introduced into the kiln at such point of it where it is desired to stop the growth of the nodules. The sand thus introduced acts in two ways, i.e. partly as a powdering agent or separating agent, partly as a means raising the melting point of the surface layer of the nodules owing to the enrichment by $SiO_2$ taking place here. Both of these effects manifest themselves in less sticky nodules and consequently a less tendency of these to grow together. After the introduction of the sand further heating of the nodules is therefore permissible in order to improve the kneading and the formation of a more homogeneous product. According to the invention the point of the sand introduction is therefore appropriately in front of the place in the kiln where there is the maximum temperature.

The crystallisable, vitreous material used according to the invention is preferably a material prepared by melting together at least 60% $SiO_2$ and at least 20% $CaO$, the remainder being metal oxides of the kind used for the manufacture of glass.

It is unessential to the method in which form the mixture of the crystallisable, vitreous material and the sand is introduced into the rotary kiln. The mixture may thus be dry or in the form of a pumpable suspension. According to the invention it may be advantageous that the mixture contains smaller amounts of fluxing or nodulising agents such as clay, soda or water glass.

The crystallisation of the crystallisable, vitreous material, which is very important to the strength of the product, is according to the invention conveniently effected by causing the kneadable mass with the embedded sand grains to be slowly cooled in the rotary kiln. This may, for example, be effected by using a kiln of sufficient length to leave a considerable distance for the material to travel from the hottest melting zone of the kiln to its discharge. The lower part of the rotary kiln will thus constitute a crystallisation zone, in which, for example, may be provided an additional burner so as to maintain the temperature for the longest possible time within the range where crystallisation takes place. This embodiment of the method is very simple since it only requires a single kiln.

The crystallisation of the crystallisable, vitreous material may, however, according to the invention also be effected by withdrawing the material from the kiln before its crystallisation and transferring it to another kiln in which it is heated to the temperature of crystallisation. This embodiment of the method may be advantageous in cases where use is made of a crystallisable, vitreous material of a composition which it is more difficult to crystallise, since, in fact, it has been found that the tendency of the vitreous masses to crystallise is greater when they are subjected to rising temperatures below the melting point than when, starting from their molten condition, they are subjected to falling temperatures. This method affords the possibility of discharging the very hot material into water so as to obtain, by means of this quenching, a thermic bursting of the material (the nodules), whereby there will be less mechanical work of crushing.

Example 1

The starting material used is a crystallisable, vitreous material produced by melting together sand, lime and dolomite so that it shows approximately the following analysis:

| | Percent |
|---|---|
| $SiO_2$ | 67 |
| $CaO$ | 25 |
| $MgO$ | 3 |
| $Al_2O_3$ | 3 |
| $Fe_2O_3$ | 1 |
| $K_2O+Na_2O$ | 1 | and sea sand taken from the bottom of the Limfjord.

These two materials are mixed in the ratio by weight of 1 part of vitreous material to 4 parts of sand, and the mixture is fed at the rate of 20 tons per hour to the upper end of a rotary kiln having an inclination of 2° and an inner diameter of 2.6 m. and a length of 70 m.

The kiln is driven at ¾ r.p.m. and under such temperature conditions that a maximum temperature of about 1250° C. is attained at a distance of about 5 m. from the outlet end. The material in the kiln forms nodules of a size up to about 30 cm. in diameter. These nodules are discharged before the vitreous material is wholly crystallised, and are then quenched, for example by means of water, whereby they are partly burst into smaller pieces. These pieces are then passed through another kiln in which they are heated to a maximum of 1100° C., whereby the crystallisable, vitreous material will be subject to crystallisation, resulting in a white, hard mineral material which after crushing and screening is available as a granular aggregate. In a grain size of 3–12 mm. this material is very suitable for use in roads with a bright surface, and in grain sizes up to 3 mm. the material is very suitable as aggregate for cement in concrete castings. The granular aggregate gives a rougher road surface than the known granular aggregates of crystallised material on glass basis and preserves its roughness despite wear owing to the sand grains embedded in the crystallised matrix.

Example 2

Use is made of the same starting materials as in Example 1, but they are mixed in the weight ratio of 3 parts of vitreous material to 7 parts of sand. The mixture is fed at the rate of 20 tons per hour to the same rotary kiln as in Example 1, and the kiln is driven at ¾ r.p.m. and under such temperature conditions that a maximum temperature of about 1300° C. is obtained at a distance of about 5 m. from the outlet end of the kiln. The growth of the nodules formed in the kiln is stopped by injection of sand at a point in the kiln where the temperature has only reached 1250° C. so that the material leaves the kiln in nodule sizes up to about 20 cm. in diameter. The nodules are quenched so that the vitreous material to some extent retains its transparent, amorphous character, and they are subsequently passed through another kiln in which they are heated to a crystallisation temperature of about 1100° C., whereby there is produced a white material which after crushing constitutes a granular aggregate of similar properties and for similar uses as the aggregate produced in Example 1.

Example 3

Use is made of the same starting materials as in Example 1, but they are mixed in the weight ratio of 1 part of vitreous material to 1 part of sand.

The mixture is fed at the rate of 20 tons per hour to a rotary kiln of the same type as that used in the preceding examples, but the flame is sent about 15 m. into the kiln and the temperature is adjusted so as to reach a maximum of about 1275° C. directly in front of the flame. The speed of rotation is ¾ r.p.m.

At a point inside the kiln where the temperature is about 1225° C. is effected an injection of sand which deposits on the surface of the nodules formed and prevents these from increasing to a size larger than about 10 cm. in diameter, even though they subsequently move through a section in the kiln in which the temperature rises by about a further 50° C.

The nodules are withdrawn from the kiln and are allowed to cool slowly, whereby a crystallisation of the vitreous material takes place so that there is obtained a white product which on crushing gives a granular aggregate of similar properties and for similar uses as the product made in Example 1.

What I claim and desire to secure by Letters Patent is:

1. A method of manufacturing a whitish, devitrified glass, granular, aggregate for building purposes comprising mixing a thermally crystallizable vitreous material and quartz sand wherein the ratio of quartz to vitreous materials is no greater than 5:1 parts, heating the mixture of said vitreous material in a rotary kiln to form a kneadable mass in which the sand grains are embedded and subsequently thermally crystallizing the crystallizable vitreous material to produce a devitrified glass aggregate.

2. A method as defined in claim 1 wherein the rotary kiln is driven at such a speed that the kneadable mass is formed into nodules.

3. A method as defined in claim 1 wherein the crystallizable vitreous material is used in a grain size of up to 3 millimeters.

4. A method as defined in claim 1 wherein the sand has a grain size below 1 millimeter.

5. A method as defined in claim 2 wherein the devitrified product is obtained in nodules in sizes of up to about ½ m. in diameter and are then subsequently reduced by crushing to the desired size.

6. A method as defined in claim 1 wherein the sand is introduced into the kiln at a point where it is desired to stop growth of the nodules.

7. A method as defined in claim 6 wherein the sand is introduced at a point inside the kiln just prior to the zone of maximum temperature in the kiln.

8. A method as defined in claim 1 wherein the crystallizable vitreous material used is obtained by melting together at least 60% $SiO_2$ and at least about 20% $CaO$, the remainder being other compatible metal oxides used in glass manufacturing.

9. A method as defined in claim 1 wherein the mixture of crystallizable vitreous material and quartz sand contains smaller amount of fluxing agents or other ingredients which aid in the formation of the nodules.

10. A method as defined in claim 1 wherein the crystallization of the crystallizable vitreous material is effected by causing the kneadable mass containing the embedded quartz and grains to be slowly cooled in the rotary kiln.

11. A method as defined in claim 1 wherein the crystallization of the crystallizable vitreous material is carried out by withdrawing the vitreous material from the kiln prior to its crystallization and transferring it to another kiln which is heated to the temperature of the crystallization of the glass.

12. A devitrified glass granular aggregate product comprising quartz sand embedded in a crystallized glass material wherein the ratio of the quartz to the glass material is not more than 5:1 parts by weight.

References Cited
UNITED STATES PATENTS

| | | |
|---|---|---|
| 2,663,658 | 12/1953 | Schurecht. |
| 2,695,851 | 11/1954 | Lodge. |
| 2,758,038 | 8/1956 | Lentz et al. |
| 3,145,114 | 8/1964 | Rindone _____ 65—33 XR |
| 3,170,812 | 2/1965 | Schwartz _____ 65—33 XR |
| 3,266,879 | 8/1966 | Kroyer _____ 65—21 |

S. LEON BASHORE, Primary Examiner

FRANK W. MIGA, Assistant Examiner

U.S. Cl. X.R.

65—33, 111, 146; 117—23, 26, 27